US012668731B2

(12) United States Patent
Konieczka et al.

(10) Patent No.: US 12,668,731 B2
(45) Date of Patent: Jun. 30, 2026

(54) ICE MELT AND TRACTION ENHANCEMENT COMPOSITIONS, AND RELATED METHODS

(71) Applicant: Green Ladder Technologies, LLC, Batavia, IL (US)

(72) Inventors: John Paul Latragna Konieczka, Chicago, IL (US); Alex Kubitz, Elburn, IL (US)

(73) Assignee: Green Ladder Technologies, LLC, Batavia, IL (US)

( * ) Notice: Subject to any disclaimer, the term of this patent is extended or adjusted under 35 U.S.C. 154(b) by 602 days.

(21) Appl. No.: 18/148,180

(22) Filed: Dec. 29, 2022

(65) Prior Publication Data

US 2023/0220257 A1     Jul. 13, 2023

Related U.S. Application Data

(60) Provisional application No. 63/294,624, filed on Dec. 29, 2021.

(51) Int. Cl.
*C09K 3/18*          (2006.01)

(52) U.S. Cl.
CPC .................................... *C09K 3/185* (2013.01)

(58) Field of Classification Search
CPC ........... C09K 3/185; C09K 3/18; C01B 33/14
See application file for complete search history.

(56) References Cited

U.S. PATENT DOCUMENTS

| | | | |
|---|---|---|---|
| 4,597,884 A | 7/1986 | Greenwald | |
| 2006/0065017 A1* | 3/2006 | Miyoshi | C04B 20/06 |
| | | | 65/30.12 |

| | | | |
|---|---|---|---|
| 2007/0020155 A1 | 1/2007 | Ohno et al. | |
| 2007/0249493 A1* | 10/2007 | Kawata | B01J 35/60 |
| | | | 502/400 |
| 2008/0315150 A1* | 12/2008 | Parisi | C09K 3/185 |
| | | | 252/71 |
| 2014/0147664 A1 | 5/2014 | Beall et al. | |

FOREIGN PATENT DOCUMENTS

| | | | | |
|---|---|---|---|---|
| CN | 107365569 A | * | 11/2017 | ............. C09K 3/185 |
| CN | 113150690 A | | 7/2021 | |
| DE | 4122963 A1 | | 10/1992 | |
| JP | 2011143358 A | | 7/2011 | |

OTHER PUBLICATIONS

CN-107365569-A, machine translation (Year: 2017).*
International Searching Authority "International Search Report and Written Opinion" From Application No. PCT/US2022/082565, Dated Apr.-Nov. 2024, p. 13.

* cited by examiner

*Primary Examiner* — Marites A Guino-O Uzzle
(74) *Attorney, Agent, or Firm* — Fredrikson & Byron, P.A.

(57)          ABSTRACT

Provided herein are various ice melt compositions, processes, and systems that utilize a porous silica amalgamate composition to provide an environmentally friendly ice melt and freezing point depression composition when in contact with ice and/or snow. In addition, the porous silica amalgamate composition provides traction enhancement on slippery surfaces. In embodiments, the porous silica amalgamate can reabsorb active ingredient(s) during the liquid drying phase to provide potential secondary and tertiary uses. Further disclosed herein are methods of using and making the treatment compositions.

23 Claims, 8 Drawing Sheets

ICE MELT AND TRACTION ENHANCEMENT COMPOSITIONS, AND RELATED METHODS

CROSS-REFERENCE TO RELATED APPLICATIONS

This application claims the benefit of U.S. Provisional Application No. 63/294,624, filed on Dec. 29, 2021, and entitled "Ice Melt and Traction Enhancement Compositions, and Related Methods," the entire contents of which are incorporated herein by reference.

TECHNICAL FIELD

The various embodiments herein relate to treatment compositions utilizing a porous structure comprising a porous silica amalgamate substrate, including open cell and/or close cell substrates, to deliver an environmentally friendly composition relating to ice melt and freezing point depression applications on ice and/or snow. The various embodiments herein further relate to methods of preparing and using the treatment compositions, including providing traction on slippery surfaces. In addition, the treatment compositions can absorb the active ingredient during the water drying phase to provide potential secondary and tertiary uses.

BACKGROUND OF THE INVENTION

Various ice melt systems are available in today's market. Current ice melt systems either provide traction—to a limited extent—or provide only an ice melt process. However, these ice melt systems used in the current market are typically corrosive to metal objects or degrade concrete and asphalt surfaces, exposing the environment to harmful or corrosive chemicals. As a further limitation, current ice melt systems are not capable of reabsorbing the active ingredients for reuse and therefore only provide a single application of use. Any subsequent uses require an additional application of the ice melt product. In addition, current ice melt products are heavy, typically 50 to 100 lb/ft$^3$, making them less user friendly to consumers.

There remains a need in the art for environmentally friendly ice melt compositions capable of providing both a traction system and melt process that can be reabsorbed for additional use. Further, there remains a need for low-density ice melt products for ease of use.

Accordingly, it is an objective of the claimed invention to develop an ice melt system that provides both a melt process and traction system that is environmentally friendly.

A further object of the invention is to provide an ice melt system that can reabsorb the active ingredients for subsequent use, reducing the amount of active ingredients required, and thereby having a smaller footprint on the environment.

A further object of the invention is to provide a composition that is lightweight in nature to allow for easy application onto a surface in need of treatment.

A further object of the invention is to utilize a porous structure with an open cell structure to improve existing ice melt systems by providing a traction capability as well as a reabsorbing capability. This reabsorbing capability is achieved when the active ingredient is immersed within the open cell kernel or when the active ingredients are added separately as a mix.

A further object of the invention is to utilize the porous structure with either an open cell or closed cell structure without any active ingredients to provide a traction capability on slippery surfaces.

Other objects, advantages, and features of the present invention will become apparent from the following specification taken in conjunction with the accompanying figures.

BRIEF SUMMARY OF THE INVENTION

Discussed herein are various treatment compositions and methods for providing both a traction system as well as an ice melt process that is further environmentally friendly. In various embodiments, the porous structures of the treatment compositions are enhanced kernels comprising a porous silica amalgamate substrate utilizing an open cell or closed cell structure, and comprising none, one active ingredient, or multiple active ingredients for melting ice and/or snow, wherein the structure of the substrate contributes to the lightweight nature of the composition. In an aspect, it is an advantage of the compositions and methods disclosed herein to provide potential reabsorption of active ingredients for additional use in subsequent applications. In embodiments, this reabsorption capability is a function of the open cell structure within the silica kernel. This network of channels permeates the entire kernel allowing open channels to penetrate the entire kernel. This in turn allows liquids to transport throughout the kernel.

In Example 1, a treatment composition comprises a porous silica amalgamate substrate having a honeycomb structure, and none to at least one active ingredient suspended within the honeycomb structure.

Example 2 relates to the composition according to Example 1, wherein the porous silica amalgamate structure comprises an open cell structure, a closed cell structure, or a combination thereof.

Example 3 relates to the composition according to Example 1, wherein the porous silica amalgamate is formed from recycled glass.

Example 4 relates to the composition according to Example 1, wherein the porous silica amalgamate substrate comprises silicon dioxide ($SiO_2$) in an amount of from about 40 wt-% to about 85 wt-%.

Example 5 relates to the composition according to Example 4, wherein the porous silica amalgamate substrate further comprises sodium oxide ($Na_2O$), lime (CaO), or a combination thereof, in an amount of from about 0 wt-% to about 25 wt-%.

Example 6 relates to the composition according to Example 4, wherein the porous silica amalgamate substrate further comprises at least one of aluminum oxide ($Al_2O_3$), magnesium oxide (MgO), boric oxide ($B_2O_3$), sodium oxide ($Na_2O$), barium oxide (BaO), or silicon nitride ($Si_3N_4$).

Example 7 relates to the composition according to Example 1, wherein the porous silica amalgamate substrate has a density of between about 10 lb/ft$^3$ and about 40 lb/ft$^3$.

Example 8 relates to the composition according to Example 1, wherein the porous silica amalgamate has a surface area of at least about 500 m$^2$/m$^3$.

Example 9 relates to the composition according to Example 1, wherein the at least one active ingredient comprises sodium chloride (NaCl), sodium hydroxide (NaOH), hydrochloric acid (HCl), calcium chloride ($CaCl_2$), magnesium chloride ($MgCl_2$), organic compounds including: grape juice, apple juice, apple cider vinegar, and/or urea, or a combination thereof.

Example 10 relates to the composition according to Example 1, wherein the at least one active ingredient is further found on a surface of the porous silica amalgamate substrate.

Example 11 relates to the composition according to Example 1, wherein the composition is pet friendly and environmentally friendly.

In Example 12, a method of lowering the freezing point of ice and/or snow comprises applying the treatment composition according to any one of Examples 1 to 10 to a surface covered in ice and/or snow, and lowering the freezing point of the ice and/or snow to melt the ice and/or snow.

Example 13 relates to the method according to Example 12, wherein the method melts the ice and/or snow at a temperature below about –60° F.

Example 14 relates to the method according to Example 12, wherein the surface is a sidewalk, a driveway, a road, a parking lot, or a combination thereof.

Example 15 relates to the method according to Example 12, wherein the applying step to the surface covered in ice and/or snow releases the at least one active ingredient onto the surface.

Example 16 relates to the method according to Example 12, further comprising a step of recharging the composition for a subsequent application of use.

Example 17 relates to the method according to Example 12, further comprising a step of crushing the composition to form particulates and increasing the coefficient of friction of the surface.

Example 18 relates to the method according to Example 17, wherein the step of crushing the composition is by a footstep, by a tire of an automobile, or a combination thereof.

Example 19 relates to the method according to Example 12, wherein the porous silica amalgamate substrate is used with an existing ice melt composition.

Example 20 relates to the method according to Example 19, further comprising a step of recharging the composition for a subsequent application of use.

Example 21 relates to the method according to Example 12, further comprising a step of crushing the composition to form particulates and increasing the coefficient of friction of the surface.

In Example 22, a method of increasing traction on a surface comprises applying a porous silica amalgamate substrate having an open cell or closed cell honeycomb structure to a surface covered in ice and/or snow, and crushing the porous silica amalgamate substrate to increase the coefficient of friction of the surface.

Example 23 relates to the method according to Example 22, wherein the crushing of the porous silica amalgamate substrate is by a footstep, by a tire of an automobile, or a combination thereof.

In Example 24, a method of making a treatment composition comprises obtaining a porous silica amalgamate substrate comprising a honeycomb structure, and impregnating the porous silica amalgamate substrate with at least one active ingredient.

Example 25 relates to the method according to Example 24, wherein the porous silica amalgamate substrate has a density of between about 10 lb./ft$^3$ and about 40 lb./ft$^3$.

Example 26 relates to the method according to Example 24, wherein the porous silica amalgamate has a surface area of at least about 500 m$^2$/m$^3$ to about 60,000 m$^2$/m$^3$.

Example 27 relates to the method according to Example 24, wherein the at least one active ingredient comprises sodium chloride (NaCl), sodium hydroxide (NaOH), hydrochloric acid (HCl), calcium chloride (CaCl$_2$), magnesium chloride (MgCl$_2$), organic compounds including: grape juice, apple juice, apple cider vinegar, and/or urea, or a combination thereof.

Example 28 relates to the method according to Example 24, wherein the at least one active ingredient is further added to a surface of the porous silica amalgamate substrate.

While multiple embodiments are disclosed, still other embodiments will become apparent to those skilled in the art from the following detailed description, which shows and describes illustrative embodiments. As will be realized, the various implementations are capable of modifications in various obvious aspects, all without departing from the spirit and scope thereof. Accordingly, the drawings and detailed description are to be regarded as illustrative in nature and not restrictive.

Figure 1:
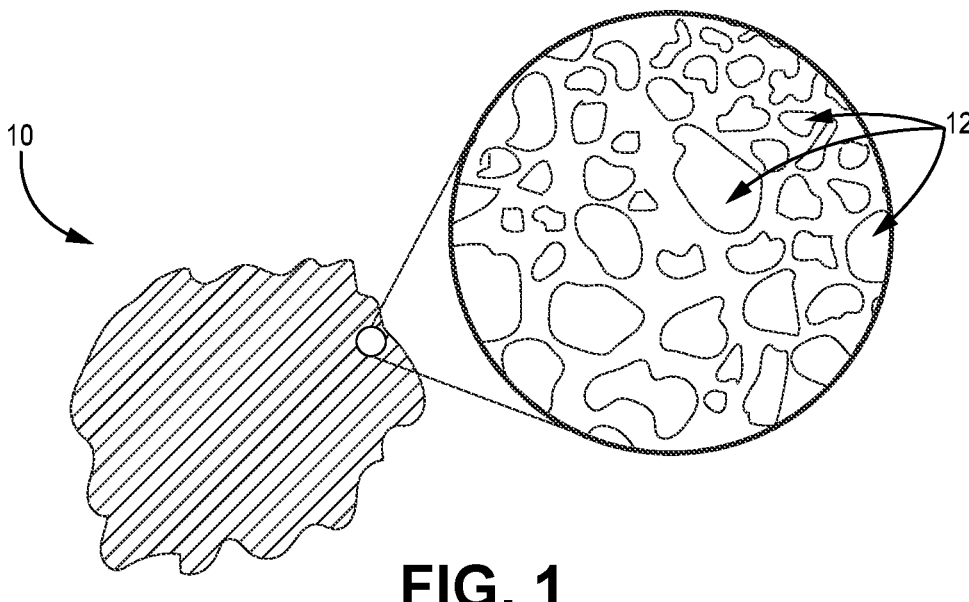
FIG. 1 depicts an embodiment of a foamed glass amalgamate comprising a vast porous structure.

Various embodiments of the present invention will be described in detail with reference to the figures. Reference to various embodiments does not limit the scope of the invention. Figures represented herein are not limitations to the various embodiments according to the invention and are presented for exemplary illustration of the invention.

DETAILED DESCRIPTION OF THE INVENTION

Disclosed and contemplated herein are treatment compositions and methods of lowering the freezing point of a treated surface and providing traction thereto. The various embodiments herein relate to kernel compositions comprising recycled silica glass such that it is processed to a low-density kernel—or porous silica amalgamate substrate—with a vast honeycomb or cell structure. The porous silica amalgamate substrate can be further enhanced by the addition of at least one active ingredient such that the at least one active ingredient is suspended within the honeycomb structure of the kernel via capillary action. Without the addition of an active ingredient, the porous silica amalgamate substrate can be used in combination with one or more other ice melts (each having its own active ingredient(s)) and provide traction control while providing a retention of the active ingredient of the one or more other ice melts during the drying phase and thereby providing a melt ability for subsequent snow/ice situations. In one aspect, a kernel as disclosed herein with a closed cell structure without an active ingredient can provide a traction property.

The various embodiments herein further relate to methods of preparing and using the treatment compositions, including methods of lowering the freezing point of ice and/or snow, and methods of increasing traction on a surface. When any kernel implementation herein is in the presence of ice and/or snow, at least one active ingredient can be released from the kernel and melt the ice and/or snow.

In addition, the kernel according to any embodiment herein beneficially provides traction by increasing the coefficient of friction of the treated surface to a factor much greater than the coefficient of friction of the ice or snow and thereby achieving a coefficient of friction similar to dry pavement. In the event the kernel is crushed either by a person's foot (via footstep) or by a tire of a vehicle, the resulting multiple pieces of the crushed substrate disperse across the treated surface, exponentially increasing the coefficient of friction of the treated surface. According to certain embodiments, after the melt phase has occurred, a portion of the active ingredients are reabsorbed into the kernel. These active ingredients remain within the kernel for future use, such as during a subsequent ice or snow fall.

The disclosed embodiments herein are not limited to particular kernel compositions or uses thereof, which can vary and are understood by skilled artisans. It is further to be understood that all terminology used herein is for the purpose of describing various embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

So that the various implementations herein may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments herein, the following terminology will be used in accordance with the definitions set out below.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½%, and 4¾% This applies regardless of the breadth of the range.

The term "about," as used herein, refers to variation in the numerical quantity that can occur, for example, through typical measuring techniques and equipment, with respect to any quantifiable variable, including, but not limited to, mass, volume, time, distance, wave length, frequency, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. Whether or not modified by the term "about," the claims include equivalents to the quantities.

The methods and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

The term "actives" or "percent actives" or "percent by weight actives" or "actives concentration" are used interchangeably herein and refers to the concentration of those active ingredients involved expressed as a percentage minus inert ingredients such as water or salts. It is also sometimes indicated by a percentage in parentheses, for example, "chemical (10%)."

The terms "foam," "foamy," or "foamed" include froths, spume, suds, heads, fluffs, fizzes, lathers, effervesces, and the like, which have an expanded structure via the use of a gas. The terms may refer to both open cell and closed cell structures. The term "bubble" means a thin, shaped, gas-filled film of molten glass. The shape may be spherical, hemispherical, rectangular, polyhedral, ovoid, and the like. The gas or "bubble atmosphere" in the gas-filled bubbles may comprise oxygen or other oxidants, nitrogen, combustion products (including but not limited to, carbon dioxide, carbon monoxide, $NO_x$, $SO_x$, $H_2S$, and water), reaction products of glass-forming ingredients (for example, but not limited to, sand (primarily $SiO_2$), clay, limestone (primarily $CaCO_3$), burnt dolomitic lime, borax and boric acid, and the like. Bubbles may include solids particles, for example soot particles, either in the film, the gas inside the film, or both.

The term "weight percent," "wt. %," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The terms "vehicle" or "car" as used herein, refer to any transportation conveyance including without limitation, automobiles, trucks, sport utility vehicles, buses, trucks, motorcycles, monorails, diesel locomotives, passenger coaches, small single engine private airplanes, corporate jet aircraft, commercial airline equipment, etc.

Compositions

In various embodiments, the composition comprises a kernel or plurality of kernels comprising a foamed glass amalgamate, such as a porous silica amalgamate substrate. In addition, this kernel can be manufactured in two distant forms—open cell and closed cell. Open cell refers to the pores within the kernel achieving a series of interconnecting channels that form passages throughout the kernel. Closed cell refers to the pores being closed off, thus forming bubbles throughout the kernel. In additional embodiments, the treatment composition further comprises at least one active ingredient in addition to the foamed glass amalgamate. The composition is capable of releasing the at least one active ingredient from the foamed glass amalgamate under predetermined conditions to provide an intended effect. In embodiments, the composition functions as an ice melt system and releases the at least one active ingredient in the presence of snow and/or ice to lower the freezing point of the ice and/or snow, or to generate heat to melt the ice and/or snow. In further embodiments, the composition or the foamed glass amalgamate provides traction within the ice or snow by increasing the coefficient of friction to a factor much greater than the coefficient of friction of ice or snow and achieving a coefficient of friction similar to dry pavement.

a) Foamed Glass Amalgamate

In an aspect, the composition comprises a foamed glass media utilizing a recycled glass material, reducing land fill by converting the recycled glass into a foamed glass amalgamate. This foamed glass amalgamate may be further referred to herein as the porous silica amalgamate substrate. In embodiments, the recycled glass comprises recycled silica glass such that it is processed to a low-density kernel with a vast honeycomb or cell structure. The vast honeycomb or cell structure comprises an open cell structure, closed cell structure, or combination thereof. An example of a commercially available open cell kernel includes, but is not limited to, GROWSTONE®, available from Good Planet Laboratories, Inc., Las Vegas, NV, and Aero Aggregates of North America, Eddystone, PA (providing both open and closed cell products). Additional open cell foamed glass substrates from manufactures may also be used, including, but not limited to, from Glass WRX SC, Beaufort, SC.

In various embodiments, the porous silica amalgamate substrate contain passages that form channels throughout the kernel. These passages are formed such that they allow for capillary action with the active ingredients, including liquids, such as water or brine solutions. As a result of the passages, active ingredients can be dispersed throughout the kernel. In embodiments, the channels may be branched or forked, and may further form a tortuous path throughout the composition. In an aspect, the foamed glass amalgamate comprises a honeycomb structure. As can be appreciated by a person having ordinary skill in the art, the width and length of these passages may vary.

In various implementations, the foamed glass amalgamate is formed from foamed silicon dioxide ($SiO_2$ or silica). In addition, processing aids or impurities may be found within the foamed glass amalgamate. In embodiments, the foamed glass amalgamate comprises the $SiO_2$ in an amount of from about 40 wt-% to about 85 wt-%, about 50 wt-% to about 80 wt-%, about 60 wt-% to about 80 wt-%, or about 75 wt-%, based on the total weight of the foamed glass amalgamate. The foamed glass amalgamate may further comprise sodium oxide ($Na_2O$), lime (CaO), or a combination thereof. In an aspect, the concentration of $Na_2O$ and/or CaO are each present in an amount less than the concentration of the $SiO_2$. In embodiments, the total concentration of $Na_2O$ and/or CaO are present in an amount of from about 0 wt-% to about 30 wt-%, 0 wt-% to about 25 wt-%, or from about 0.1 wt-% to about 20 wt-%. In an aspect, the foamed glass amalgamate may optionally comprise, but is not limited to, a variety of other additives including aluminum oxide ($Al_2O_3$), magnesium oxide (MgO), boric oxide ($B_2O_3$), sodium oxide ($Na_2O$), barium oxide (BaO), silicon nitride ($Si_3N_4$), or a combination thereof. The foamed glass amalgamate may comprise the other additives in an amount of from about 0% to about 25%, about 5% to about 20%, or about 5% to about 10%. In various embodiments, the concentration of the components within the foamed glass amalgamate may vary depending on the intended crush strength of the final kernel as well as the channel structure within the kernel as would be understood by a person having ordinary skill in the art. In addition, without being limited according to the invention, all ranges recited are inclusive of the numbers defining the range and include each integer within the defined range.

In further embodiments, the foamed glass amalgamate has a target density of between about 10 lb./ft$^3$ to about 40 lb./ft$^3$, about 12 lb./ft$^3$ to about 30 lb./ft$^3$, about 15 lb./ft$^3$ to about 20 lb./ft$^3$, or about 18 lb./ft$^3$. Beneficially, the density of the foamed glass amalgamate provides a lightweight composition. The lightweight composition provides a significant improvement over conventional ice melt products and/or traction products which can have a density of about 60 lb./ft$^3$ or more.

In an illustrative example, FIG. 1 depicts a foamed glass amalgamate or kernel 10 comprising a vast porous structure having a plurality of pores 12 defined therein as shown in the expanded view of the amalgamate 10. The porous structure yields a high degree of surface area in the amalgamate 10 which can range from about 300 $m^2/m^3$ to 60,000 $m^2/m^3$, about 500 $m^2/m^3$ to about 60,000 $m^2/m^3$, about 1000 $m^2/m^3$ to about 60,000 $m^2/m^3$, about 1000 $m^2/m^3$ to about 40,000 $m^2/m^3$, about 1000 $m^2/m^3$ to about 15,000 $m^2/m^3$, or about 1000 $m^2/m^3$ to about 10,000 $m^2/m^3$ as measured via nitrogen testing. In embodiments, the surface area of the foamed glass amalgamate 10 is at least about 500 $m^2/m^3$. This enhanced surface area is critical to establishing the functional properties of the composition.

The compositions may optionally comprise additional organic compounds and minerals to change the surface morphology of the compositions, including enhancing the catalytic properties relating to chemical reactions, or promoting unique chemical properties upon the surface of the kernel 10.

b) Active Ingredient

Figure 2:
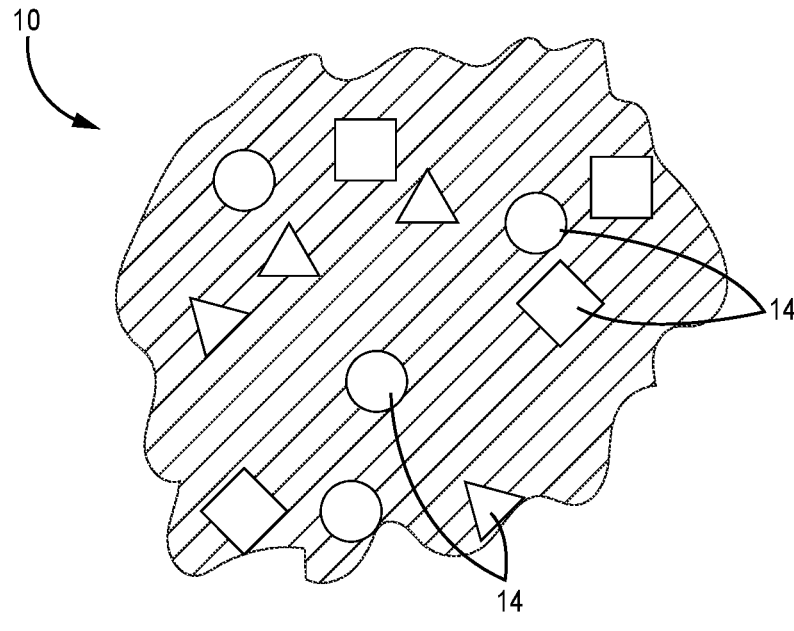
FIG. 2 depicts an embodiment of a foamed glass amalgamate with active chemical compounds suspended within the vast porous structure. The active chemical compounds may be found both internally and externally throughout the vast porous structure.

In various embodiments, the compositions further comprise at least one active ingredient suspended within the foamed glass amalgamate. As illustrated schematically in FIG. 2, the internal honeycomb structure of the foamed glass amalgamate 10 is utilized to suspend the active chemical compounds 14 within the substructure of the kernel 10 as well as on the surface. Dependent upon the function of the composition, a single active ingredient 14 can be deposited within and/or on the kernel, or a multitude of active ingredients 14 can be deposited within and/or on the kernel. In one example, a portion of the kernel 10 can be impregnated with a specific active ingredient (such as an acid) while the remainder of the kernel 10 can be impregnated with an alternative active ingredient (such as a base). In embodiments directed to an ice melt system, this combination of both types of kernels could beneficially melt large quantities of ice due to the large exothermic reaction. In an aspect, the active ingredients contribute to one or more beneficial properties and applications of the compositions, including providing pet friendly compositions, environmentally friendly compositions, as well as low temperature applications (i.e. around −60° F.).

In certain embodiments, the at least one active ingredient comprises sodium chloride (NaCl), sodium hydroxide (NaOH), hydrochloric acid (HCl), calcium chloride ($CaCl_2$), magnesium chloride ($MgCl_2$), organic compounds including: grape juice, apple juice, apple cider vinegar, and/or urea, or a combination thereof. In additional embodiments, the at least one active ingredient may be any active ingredient contemplated by a person having ordinary skill in the art depending upon the application of use of the compositions.

In an aspect, the composition comprises the at least one active ingredient in an amount of from about 0 wt-% to about 50 wt-%, from about 2 wt-% to about 40 wt-%, or about 5 wt-% to about 40 wt-% based on the total weight of the composition. In addition, without being limited according to the invention, all ranges recited are inclusive of the numbers defining the range and include each integer within the defined range.

In an additional aspect, the foamed glass amalgamate can improve an existing ice melt system or composition by providing a traction capability as well as a reabsorption capability to the existing ice melt system.

Methods of Use

The compositions disclosed herein may be used for a variety of applications to deliver an active ingredient to a surface in need of treatment. The honeycomb structure of the composition allows for a variety of active ingredients to be suspended within the honeycomb structure and released under predetermined conditions. In various embodiments, the composition is used as an ice melt composition, traction enhancer, or a combination thereof. In an aspect, the method comprises providing the active ingredients to the silica foamed glass amalgamate during the manufacturing process thus embedding the active ingredients within the kernel glass matrix. In an additional aspect, the method may include utilizing a post kernel manufacture process to incorporate the active ingredients within the cell structure after manufacture within a separate unit operation.

Figure 3:
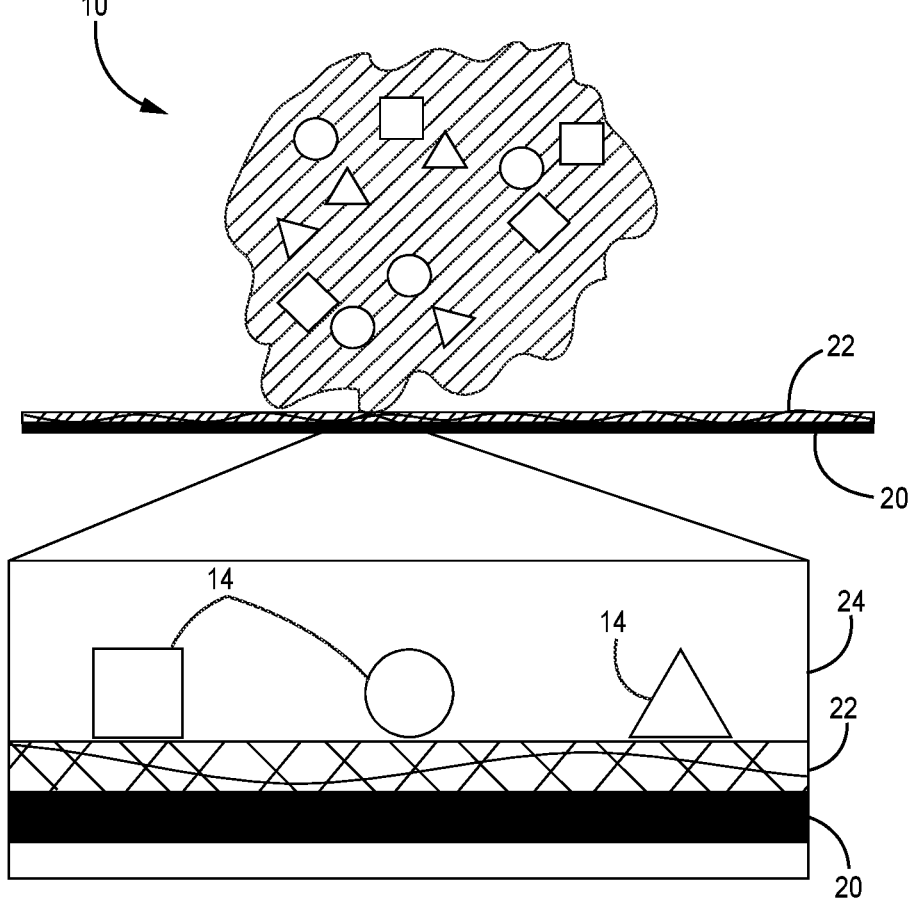
FIG. 3 depicts the boundary layer at the interface between the treatment composition and the ice and/or snow.
Figure 4:
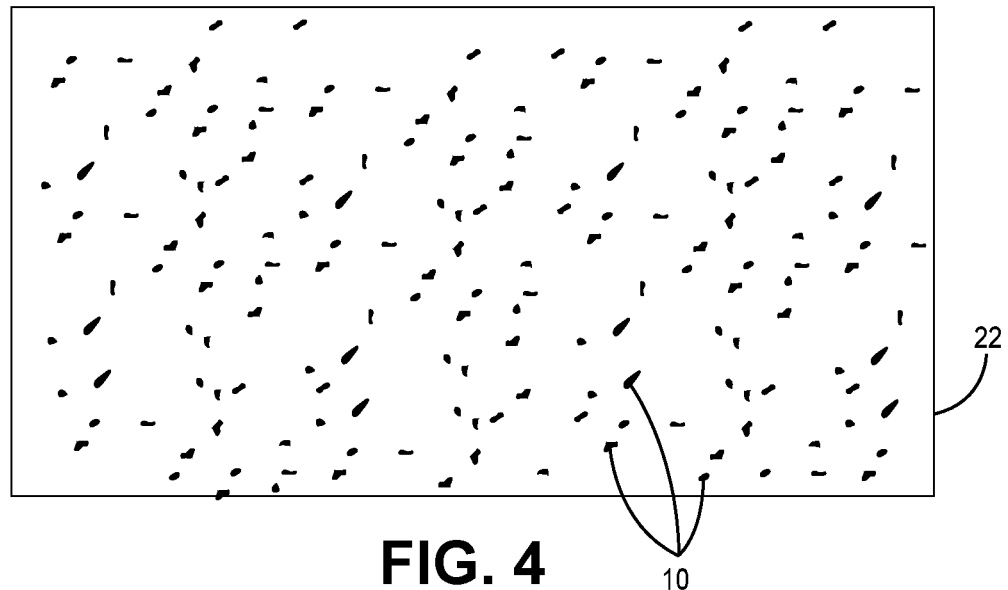
FIG. 4 illustrates an embodiment of a top view of the treatment composition applied over a surface covered in snow and/or ice.

As illustrated in FIG. 3 and FIG. 4, the various methods herein can comprise applying a plurality of kernels (referred to herein as "the composition") to a desired surface 20 covered in ice and/or snow 22. In this embodiment as shown in FIG. 3, an expanded view of one kernel 10 represents the composition. In contrast, FIG. 4 depicts a plurality of the kernels 10 disposed on the ice/snow layer 22. FIG. 4 shows a high-level view of the kernels as viewed from above, and therefore depict the kernels 10 at a smaller scale. The composition contacts the ice or snow 22 at an interface 24 between the porous glass amalgamate surfaces and the ice/snow 22, referred to herein as the boundary layer 24. Upon expanding the boundary layer of the composition to the ice and/or snow interface 24 (see FIG. 5A), the active ingredients 14 interface with this boundary layer 24 resulting in two distinct chemical reactions. The first reaction includes solubilizing the active ingredient via the ice and/or snow interface. This solubilization process results in a second reaction including generating heat due to the exothermic reaction of the process. As a result of the exothermic reaction, the generated heat continues to melt the ice and/or snow. Subsequent exothermic reactions continue to dissolve the active ingredients into a liquid phase and in turn lowers or suppresses the freezing point of the ice and/or snow, leading to additional melting of the ice and/or snow on the treated surface.

Figure 5A:
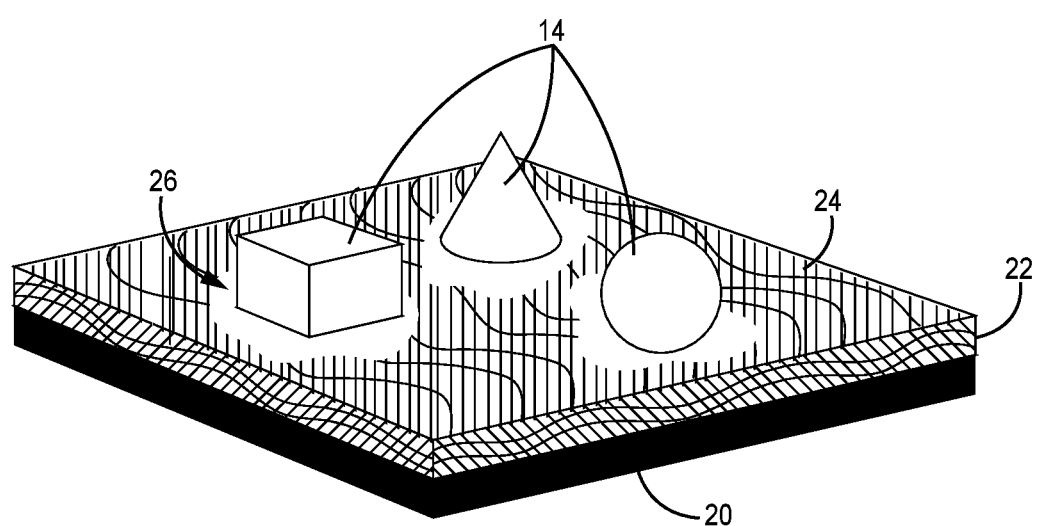
FIG. 5A depicts the freezing point depression and heat generation properties of the treatment composition when applied to a surface resulting in a liquid phase around the treatment composition as the treatment composition continues to melt the ice and/or snow on the surface.
Figure 5B:
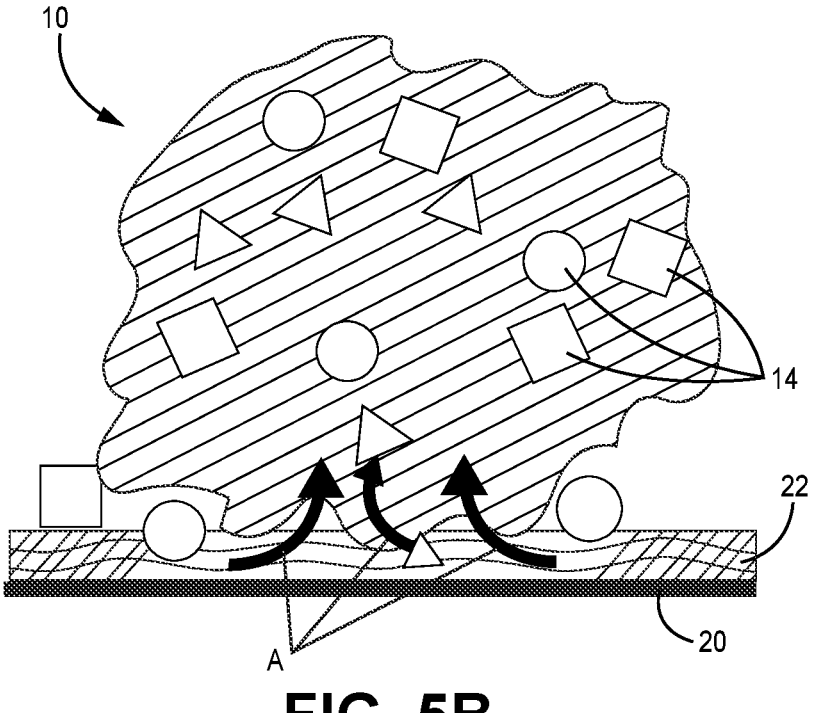
FIG. 5B depicts the process of the liquid melt phase flowing into the foamed glass amalgamate via capillary action to solubilize additional active ingredients.
Figure 6:
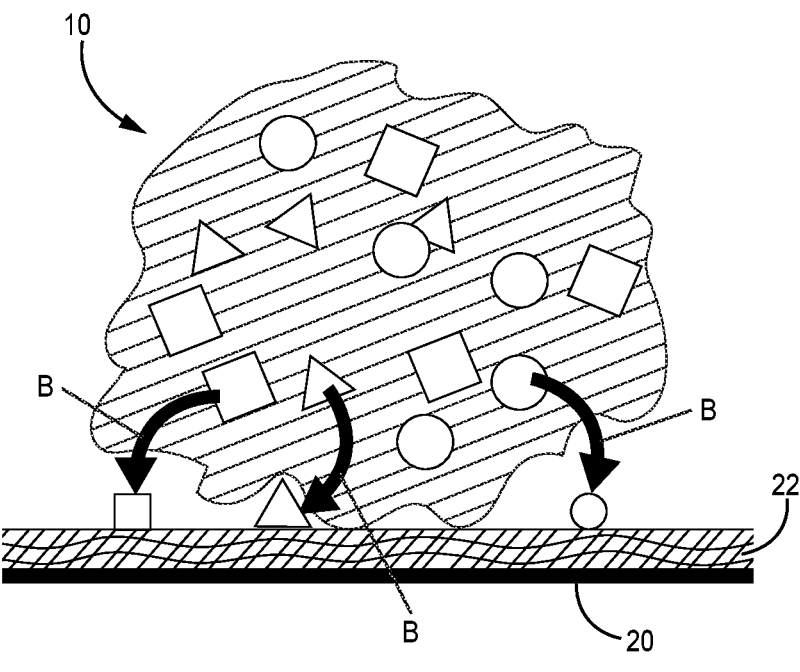
FIG. 6 depicts the enhanced melt properties of the treatment composition as the higher concentration solution containing the solubilized active ingredients flow from the kernel back to the liquid melt phase on the treated surface via mass transfer.

In an aspect as best shown in FIG. 5A, as the melting process proceeds, liquid will flow in a radial direction from the composition and pooling onto the treated surface 20 to form a liquid melt phase 26. In additional embodiments, the liquid melt phase will flow into the kernel 10 via capillary action (as represented by arrows A) and solubilize additional active ingredients as illustrated in FIG. 5B. As further illustrated in FIG. 6, the resulting higher concentration solution containing the solubilized active ingredients will flow from the kernel 10 back to the liquid melt phase 26 on the treated surface via mass transfer (as represented by arrows B), thus optimizing the activated chemical utilization and melting characteristics of the kernel 10 and leading to an enhanced ice melt system.

In various implementations, the methods comprise applying the compositions onto a surface in need of treatment. Suitable surfaces in need of treatment include, but are not limited to, a sidewalk, a driveway, a road, or a parking lot. Upon spreading the composition onto a surface covered in ice and/or snow, the composition activates and releases its active ingredients onto the treated surface, resulting in the melting of the ice and/or snow.

Figure 7:
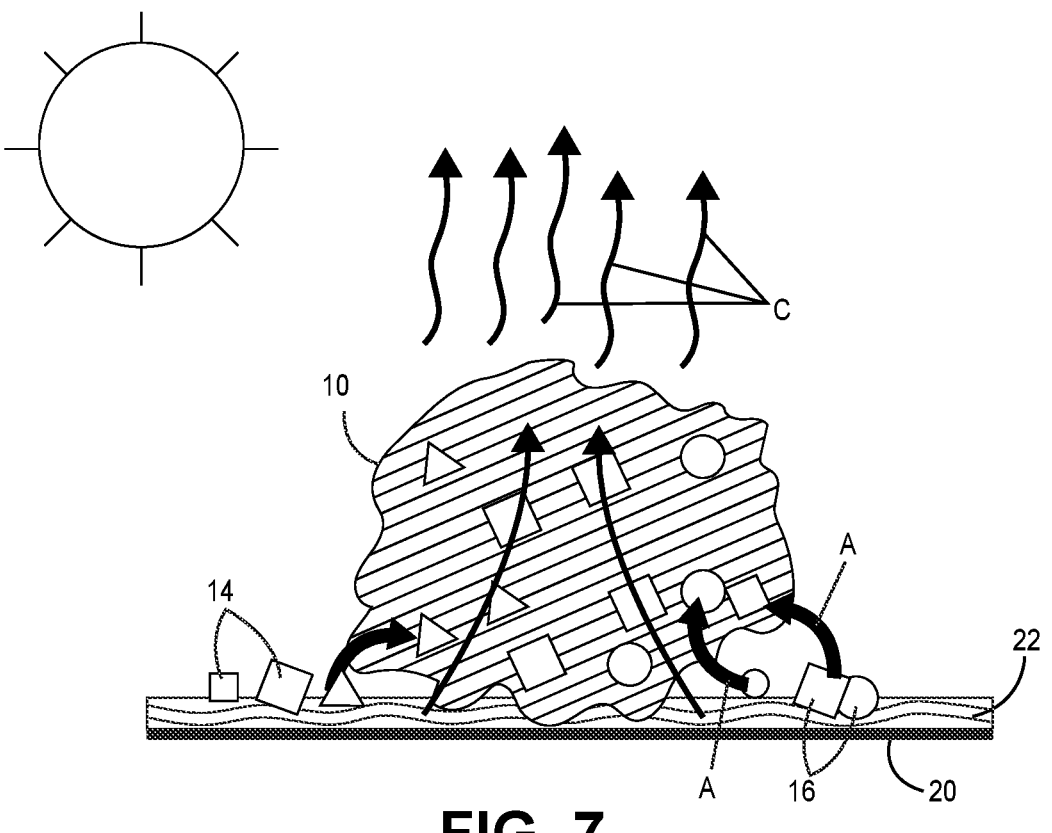
FIG. 7 depicts the process of evaporation resulting in the brine solution moving from the treated surface into the interior of the foamed glass amalgamate. Provided the enhanced surface area of the open cell foamed glass amalgamate kernel versus the surrounding brine solution, water vapor expels the open cell foamed glass amalgamate kernel at a higher rate resulting in a continuous flow of brine solution to the kernel and subsequent re-concentration of the active ingredient within the kernel.
Figure 8:
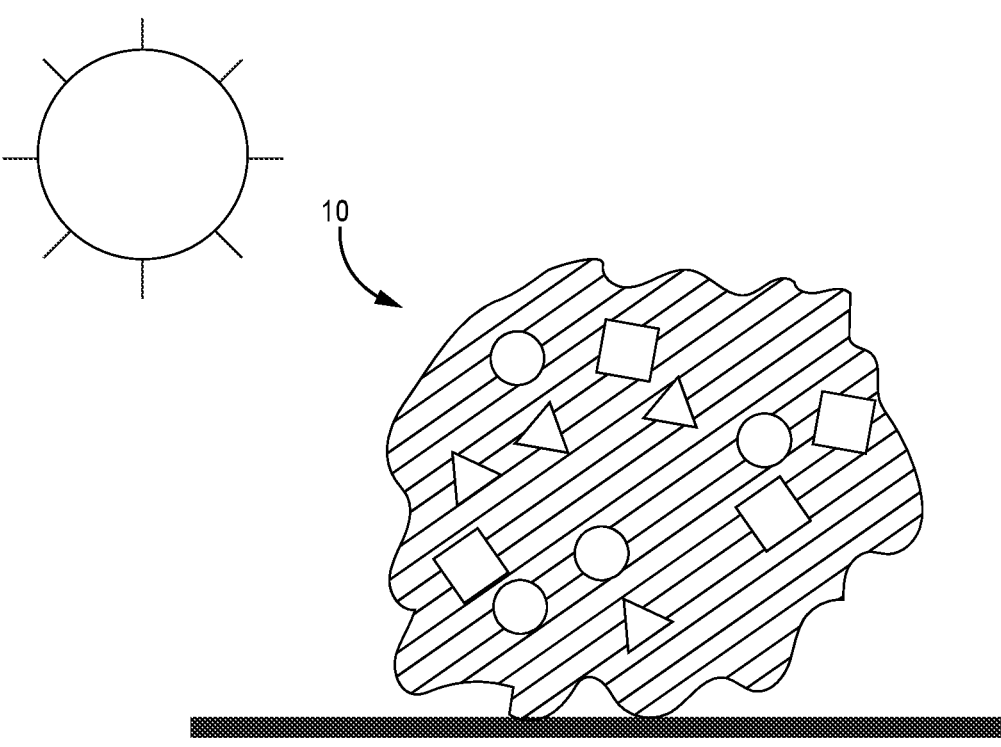
FIG. 8 is an illustration of an embodiment of a recharged treatment composition, where the foamed glass amalgamate is recharged with active ingredient(s).

In additional implementations, once the ice and/or snow 22 has been melted, a pool of brine solution covers the surface 20 as a result of the solubilized active ingredients 14 within the melted ice and/or snow 22. As shown in FIG. 7, the water phase of the brine solution and any liquid within the open cell foamed glass amalgamate 10 will begin to evaporate (as represented by arrows C). Due to the excessive surface area of the foamed glass amalgamate 10, the rate of evaporation will be significantly greater from the foamed glass amalgamate 10 than the surrounding area of the foamed glass amalgamate. This in turn will cause the brine solution to move from the treated surface 20 into the interior of the foamed glass amalgamate 10 resulting in the recharging of the composition with active ingredients. Hence, as the brine solution moves through the foamed glass amalgamate via mass transfer and capillary action (as represented by arrows A), the process further replaces the water vapor lost due to evaporation. The remaining active ingredients 14 within the brine solution will therefore continue to increase in concentration within the composition and thus resulting in a recharged composition 10 as shown in FIG. 8. Beneficially, the recharged composition 10 may then be used for a subsequent application to a surface in need of treatment.

Figure 10:
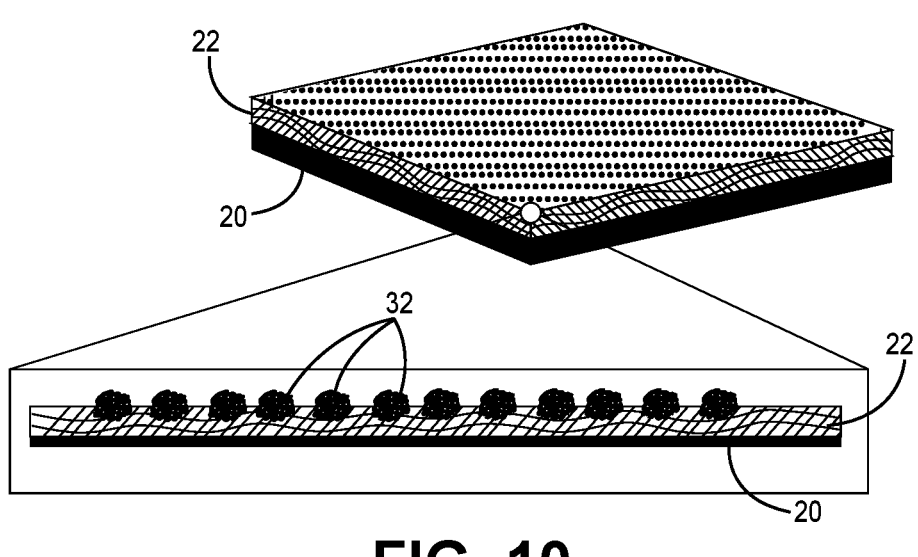
FIG. 10 is an illustration of the increased traction that results from the crushing of the treatment composition or foamed glass amalgamate.
Figures 11A, 11B, 11C, 11D:
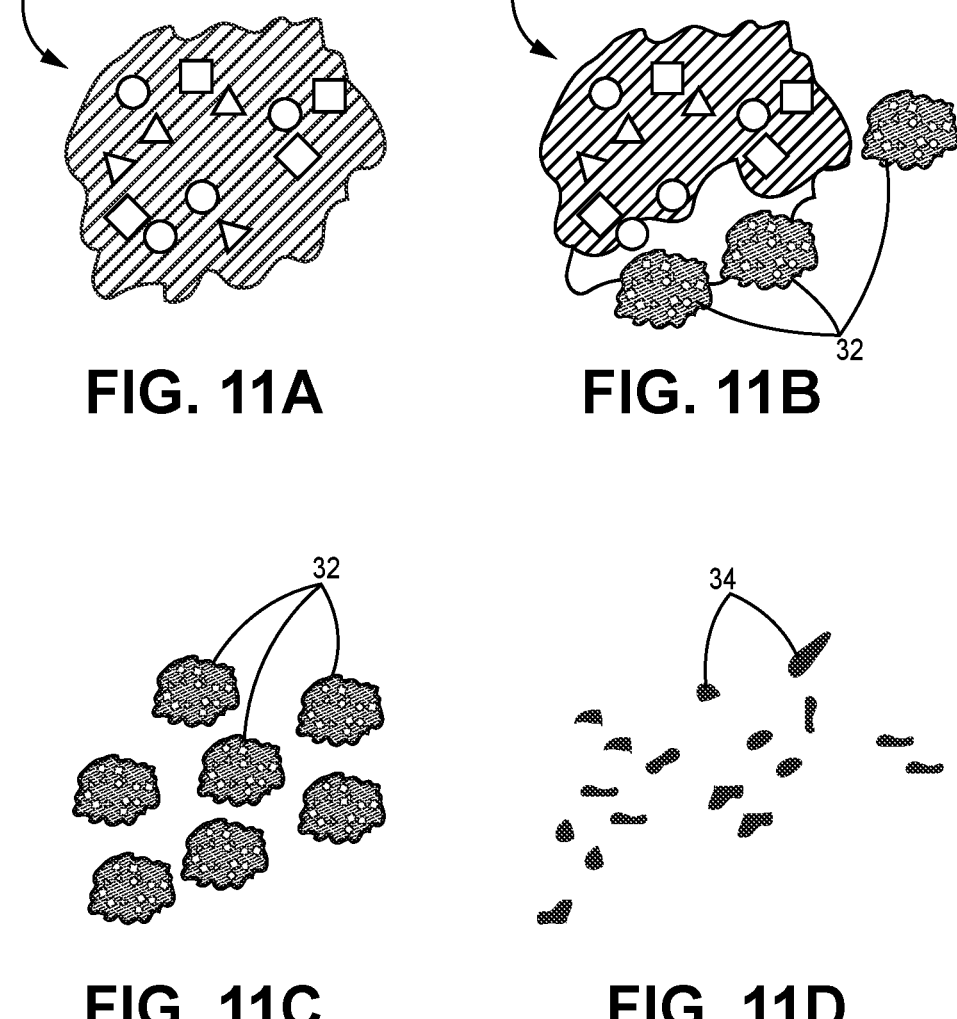
FIG. 11A details a first exemplary stage of the breakdown of the treatment composition from a whole kernel, to a fractured kernel with smaller sized particulates, to small particulates with some fines, and lastly to tens of thousands of fines to optimize traction based on the amount of force applied to the kernel.
FIG. 11B details a second exemplary stage of the breakdown of the treatment composition from a whole kernel, to a fractured kernel with smaller sized particulates, to small particulates with some fines, and lastly to tens of thousands of fines to optimize traction based on the amount of force applied to the kernel.
FIG. 11C details a third exemplary stage of the breakdown of the treatment composition from a whole kernel, to a fractured kernel with smaller sized particulates, to small particulates with some fines, and lastly to tens of thousands of fines to optimize traction based on the amount of force applied to the kernel.
FIG. 11D details a fourth exemplary stage of the breakdown of the treatment composition from a whole kernel, to a fractured kernel with smaller sized particulates, to small particulates with some fines, and lastly to tens of thousands of fines to optimize traction based on the amount of force applied to the kernel.

In various embodiments, the methods further comprise traction enhancement to a surface in need of treatment. The traction enhancement capability of the composition disclosed herein is achieved when the plurality of kernels (the "composition") is crushed. As illustrated within FIG. 10, the crushing of the kernels 10 results in tens of thousands of crushed kernel particles 32 or fines 34 (as best shown in FIG. 11D, which is discussed below) dispersed throughout a region in which the kernel 10 is crushed. In this embodiment as depicted in FIG. 10, only particles 32 are depicted. These particles 32 or fines 34 (as best shown in FIG. 11D, which is discussed below) form an interface between the surface in need of treatment (i.e., the sidewalk, the parking lot, the road, or the driveway), such that they enhance the coefficient of friction of the resulting surface to a coefficient of friction closer to that of a dry or near dry surface. In some embodiments, the size of the particles may be greater than about ¹⁄₆₄ of an inch. In further embodiments, the size of the fines may be about ¹⁄₆₄ of an inch or less.

Figure 9:
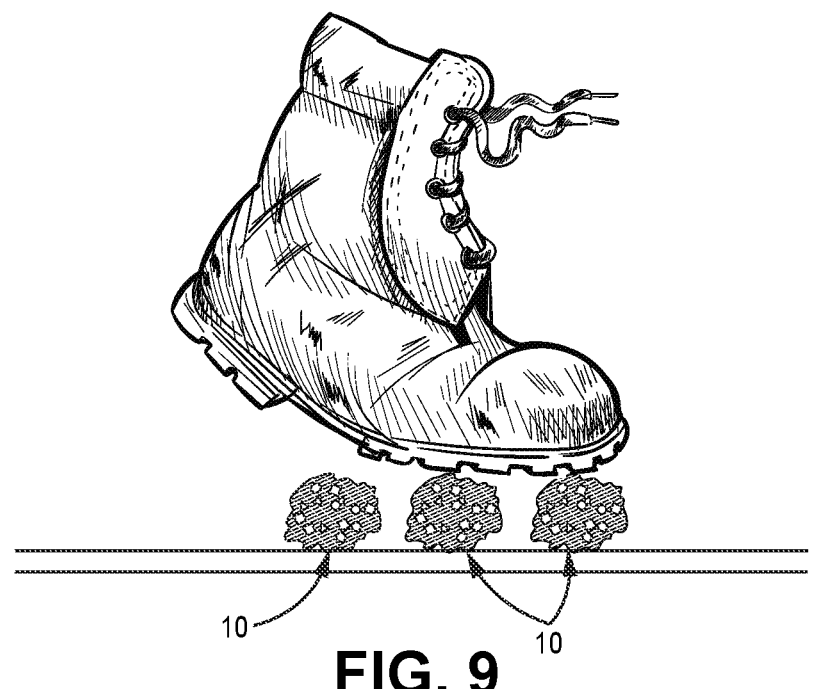
FIG. 9 depicts the crushing process of the treatment composition with a shoe to form smaller sized particulates.

An example of the crushing process is illustrated in FIG. 9. The figure demonstrates how a person walking on the composition can supply sufficient force via a foot (in this case wearing a boot 30) to crush the kernels 10. In an aspect, this process occurs in four stages as shown in FIGS. 11A-11D. In Stage A as shown in FIG. 11A, the crushing force comes in direct contact with the composition (represented by a kernel 10). At Stage B as shown in FIG. 11B, the crushing force is applied, and the kernel 10 is fractured resulting in smaller sized particulates 32. At the smaller particulate size of the particles 32, the traction is improved while still maintaining the recharging characteristics of the kernel 10 as disclosed herein. At Stage C as shown in FIG. 11C, after the composition 10 sustains additional contacts with a crushing force or significant force, the kernel 10 is reduced to small particulates 32 with some fines (not shown). At this stage, the recharging characteristics have been depleted due to the small size of the crushed particulates 32, however, the traction properties have improved. At Stage D as shown in FIG. 11D, after subsequent crushes, the particles 32 become fines 34, which are smaller than the particles 32. The resulting tens of thousands of fines 34 optimize the traction characteristics of the composition, ultimately moving the coefficient of friction to roughly the same as dry payment.

As will be understood by a person having ordinary skill in the art, the crush force of the kernel is adjusted to meet the needs of the application. In embodiments, the size of the composition is adjusted depending on the type of application of use. For example, for applications of use to a surface such as sidewalks and parking lots, the crush force is sufficiently low such that a footstep will crush the kernel. In an aspect, a smaller kernel size may be anticipated for use. In additional embodiments, for applications of use to a surface such as roadways, the kernel is modified to increase the crush strength so that the force of footsteps will not crush the kernel. Instead, the force of an automobile tire will be sufficient to crush the kernel, making the kernel suitable for applications to roadways. The ability to adjust the crush strength of the composition is significant for maintaining the balance between the reabsorption capabilities of the compositions for subsequent use, and the ability to provide sufficient traction on a particular surface in need of treatment.

In an additional embodiment, the methods may further include utilizing the foamed glass amalgamate with an existing ice melt system or composition to provide a traction capability as well as a reabsorption capability to the existing ice melt system. In an aspect, when combined with an existing ice melt system, the foamed glass amalgamate beneficially recharges with the active ingredients of the existing ice melt system and may then be used for a subsequent application to a surface in need of treatment. In a further aspect, the foamed glass amalgamate can provide a traction enhancement capability to the existing ice melt system when the kernel is crushed as described herein.

Methods of Making

Further disclosed herein are methods of making the treatment composition. In various embodiments, the composition is made by providing a foamed glass amalgamate, or porous silica amalgamate substrate, and impregnating the foamed glass amalgamate with at least one active ingredient. In an embodiment, it is important for the foamed glass amalgamate to harbor characteristics suitable for suspending an active ingredient, while having the capability to releasing the active ingredient in a predetermined environment. In an aspect, suitable foamed glass amalgamates comprise a honeycomb structure. In a further embodiment, the composition is an open cell kernel. The method may be further understood to include utilize a closed cell foamed glass amalgamate for applications of use for enhanced traction.

In embodiments, the size of the porous glass amalgamate is in the range of from about ¹⁄₃₂ in. to about 2 in., about ¹⁄₂₄ in. to about 1.5 in., or about ¹⁄₁₆ in. to about 1 in. In embodiments, the density of the foamed glass amalgamate is in the range of from about 10 lb./ft³ to about 40 lb./ft³, about 12 lb./ft³ to about 30 lb./ft³, or about 12 lb./ft³ to about 20 lb./ft³ based on the application of use. Without being limited according to the invention, all ranges recited are inclusive of the numbers defining the range and include each integer within the defined range.

In an aspect, the open cell kernel allows for the impregnation of the kernel with at least one active ingredient. Dependent upon the application of use, the composition can hold between about 10% and about 60% of its weight with active ingredient. In a further embodiment, the vast surface area of the composition is a key characteristic for the recharging properties of the composition. In embodiments, the degree of surface area of the foamed glass amalgamate can range from 300 $m^2/m^3$ to 60,000 $m^2/m^3$, about 500 $m^2/m^3$ to about 60,000 $m^2/m^3$, about 1000 $m^2/m^3$ to about 60,000 $m^2/m^3$, about 1000 $m^2/m^3$ to about 40,000 $m^2/m^3$, about 1000 $m^2/m^3$ to about 15,000 $m^2/m^3$, or about 1000 $m^2/m^3$ to about 10,000 $m^2/m^3$ as measured via nitrogen testing. In embodiments, the surface area of the foamed glass amalgamate is at least about 500 $m^2/m^3$. Without being limited according to the invention, all ranges recited are inclusive of the numbers defining the range and include each integer within the defined range.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLE

Embodiments of the present invention are further defined in the following non-limiting Example. It should be understood that this Example, while indicating certain embodiments of the invention, is given by way of illustration only. From the above discussion and this Example, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Figure 12:
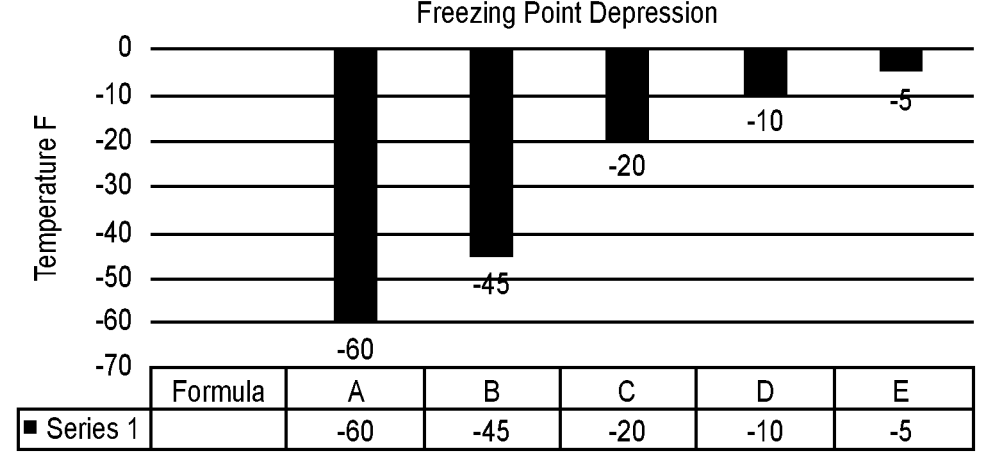
FIG. 12 depicts a table showing the freezing point depression of five exemplary formulations utilizing a porous silica amalgamate substrate.

An analysis of freezing point depression was conducted utilizing the composition and methods described herein. Five exemplary ice melt formulations were evaluated utilizing a porous silica amalgamate substrate. Data was generated to determine the temperature at which melt was achieved for each exemplary formulation A through E. The results are shown in FIG. 12. As shown in FIG. 12, the formulations successfully lowered the freezing point in the range of −5° F. to −60° F., demonstrating its efficacy as an ice melt composition.

The inventions being thus described, it will be obvious that the same may be varied in many ways. Such variations are not to be regarded as a departure from the spirit and scope of the inventions and all such modifications are intended to be included within the scope of the following claims.

What is claimed is:
1. A treatment composition comprising:
   a porous silica amalgamate substrate having a honeycomb structure, wherein the porous silica amalgamate substrate has a density of between about 10 lb./ft$^3$ and about 40 lb./ft$^3$; and
   none to at least one active ingredient suspended within the honeycomb structure.
2. The composition of claim 1, wherein the porous silica amalgamate structure comprises an open cell structure, a closed cell structure, or a combination thereof.
3. The composition of 1, wherein the porous silica amalgamate is formed from recycled glass.
4. The composition of claim 1, wherein the porous silica amalgamate substrate comprises silicon dioxide ($SiO_2$) in an amount of from about 40 wt-% to about 85 wt-%.
5. The composition of claim 4, wherein the porous silica amalgamate substrate further comprises sodium oxide ($Na_2O$), lime (CaO), or a combination thereof, in an amount of from about 0 wt-% to about 25 wt-%.
6. The composition of claim 4, wherein the porous silica amalgamate substrate further comprises at least one of aluminum oxide ($Al_2O_3$), magnesium oxide (MgO), boric oxide ($B_2O_3$), sodium oxide ($Na_2O$), barium oxide (BaO), or silicon nitride ($Si_3N_4$).
7. The composition of claim 1, wherein the porous silica amalgamate has a surface area of at least about 500 m$^2$/m$^3$.
8. The composition of claim 1, wherein the at least one active ingredient comprises at least one of sodium chloride (NaCl), sodium hydroxide (NaOH), hydrochloric acid (HCl), calcium chloride ($CaCl_2$), magnesium chloride ($MgCl_2$), and organic compounds.
9. The composition of claim 1, wherein the at least one active ingredient is further found on a surface of the porous silica amalgamate substrate.
10. A method of lowering the freezing point of ice and/or snow comprising:
   applying the treatment composition according to claim 1 to a surface covered in ice and/or snow; and
   lowering the freezing point of the ice and/or snow to melt the ice and/or snow.
11. The method of claim 10, wherein the method melts the ice and/or snow at a temperature below about −60° F.
12. The method of claim 10, wherein the surface is a sidewalk, a driveway, a road, a parking lot, or a combination thereof.
13. The method of claim 10, wherein the applying step to the surface covered in ice and/or snow releases the at least one active ingredient onto the surface.
14. The method of claim 10, further comprising a step of recharging the composition for a subsequent application of use.
15. The method of claim 10, further comprising a step of crushing the composition to form particulates and increasing the coefficient of friction of the surface.
16. The method of claim 15, wherein the step of crushing the composition is by a footstep, by a tire of an automobile, or a combination thereof.
17. The method of claim 10, wherein the porous silica amalgamate substrate is used with an existing ice melt composition.
18. The method of claim 17, further comprising a step of recharging the composition for a subsequent application of use.
19. The method of claim 10, further comprising a step of crushing the composition to form particulates and increasing the coefficient of friction of the surface.
20. A method of making a treatment composition comprising:
   obtaining a porous silica amalgamate substrate comprising a honeycomb structure, and wherein the porous silica amalgamate substrate has a density of between about 10 lb./ft$^3$ and about 40 lb./ft$^3$; and
   impregnating the porous silica amalgamate substrate with at least one active ingredient.
21. The method of claim 20, wherein the porous silica amalgamate has a surface area of at least about 500 m$^2$/m$^3$ to about 60,000 m$^2$/m$^3$.
22. The method of claim 20, wherein the at least one active ingredient comprises at least one of sodium chloride (NaCl), sodium hydroxide (NaOH), hydrochloric acid (HCl), calcium chloride ($CaCl_2$), magnesium chloride ($MgCl_2$) and organic compounds.
23. The method of claim 20, wherein the at least one active ingredient is further added to a surface of the porous silica amalgamate substrate.

* * * * *